(12) United States Patent
Signaroldi

(10) Patent No.: US 8,303,214 B2
(45) Date of Patent: Nov. 6, 2012

(54) LAY RAMP FOR AN UNDERWATER-PIPELINE LAYING VESSEL, LAY RAMP ACTUATING METHOD, AND LAYING VESSEL COMPRISING SUCH A LAY RAMP

(75) Inventor: Teresio Signaroldi, Sordio (IT)

(73) Assignee: Saipem S.p.A., San Donato Milanese (IT)

( * ) Notice: Subject to any disclaimer, the term of this patent is extended or adjusted under 35 U.S.C. 154(b) by 411 days.

(21) Appl. No.: 12/449,049

(22) PCT Filed: Dec. 21, 2007

(86) PCT No.: PCT/EP2007/064524
§ 371 (c)(1),
(2), (4) Date: Nov. 30, 2009

(87) PCT Pub. No.: WO2008/086938
PCT Pub. Date: Jul. 24, 2008

(65) Prior Publication Data
US 2010/0086360 A1    Apr. 8, 2010

(30) Foreign Application Priority Data

Jan. 17, 2007  (IT) .............................. TO2007A0027

(51) Int. Cl.
*F16L 1/225*   (2006.01)
(52) U.S. Cl. .................................... 405/166; 405/168.1
(58) Field of Classification Search ............... 405/154.1, 405/158, 166, 167, 168.1, 168.3, 168.4, 169; 114/258, 263, 362, 260, 259; 14/71.1–71.7, 14/2.6, 27, 42, 31
See application file for complete search history.

(56) References Cited

U.S. PATENT DOCUMENTS

| | | | |
|---|---|---|---|
| 3,300,187 A | 1/1967 | Krogstad et al. | |
| 3,470,057 A | 9/1969 | Stuart et al. | |
| 4,257,718 A | 3/1981 | Rosa et al. | |
| 4,574,023 A | 3/1986 | Edwards et al. | |
| 4,913,080 A * | 4/1990 | Kindem et al. | 114/250 |
| 5,395,454 A | 3/1995 | Robert | |
| 6,044,787 A | 4/2000 | Elmbo | |
| 6,065,781 A | 5/2000 | Titus | |
| 6,440,245 B1 | 8/2002 | Culzoni | |

(Continued)

FOREIGN PATENT DOCUMENTS

DE    102004056462    6/2006

(Continued)

OTHER PUBLICATIONS

International Search Report Apr. 29, 2008 in PCT/EP2007/064524.

(Continued)

*Primary Examiner* — Sunil Singh
*Assistant Examiner* — Sean Andrish
(74) *Attorney, Agent, or Firm* — Davidson Berquist Jackson & Gowdey, LLP

(57) ABSTRACT

A lay ramp for an underwater-pipeline laying vessel has an inside ramp hinged to the laying vessel; an outside ramp hinged to the inside ramp; and an actuating device having a first actuating assembly for rotating the inside ramp with respect to the laying vessel, and a second actuating assembly secured to the outside ramp and to the first actuating assembly to rotate the outside ramp with respect to the inside ramp.

13 Claims, 7 Drawing Sheets

U.S. PATENT DOCUMENTS

| | | |
|---|---|---|
| 7,093,860 B2 | 8/2006 | Fawley |
| 2005/0244578 A1 | 11/2005 | Van Egmond |

FOREIGN PATENT DOCUMENTS

| | | |
|---|---|---|
| EP | 1013514 | 7/2000 |
| EP | 1217276 | 6/2002 |
| FR | 1394983 | 4/1965 |
| FR | 2723006 | 2/1996 |
| GB | 899644 | 6/1962 |
| GB | 2232740 | 12/1990 |

OTHER PUBLICATIONS

U.S. Appl. No. 12/385,794—Mar. 9, 2010 PTO Office Action.
U.S. Appl. No. 12/385,794—Sep. 22, 2010 PTO Office Action.
U.S. Appl. No. 12/448,194—Dec. 3, 2010 PTO Office Action.
European Search Report mailed Apr. 29, 2008 in PCT Application No. PCT/EP2007/064524.
U.S. Appl. No. 12/448,194—Jun. 21, 2010 PTO Office Action.
International Search Report and Written Opinion mailed Dec. 17, 2008 in PCT/IB2008/000863.
International Search Report and Written Opinion mailed Jul. 25, 2008 in PCT/IB2008/000441.
International Search Report mailed Jan. 31, 2008 in Application PCT/EP2007/061118.
International Preliminary Report on Patentability and Written Opinion in PCT Appln. No. PCT/EP2007/061118, mailed Apr. 22, 2009.
U.S. Appl. No. 12/385,794—Mar. 21, 2011 PTO Office Action.
U.S. Appl. No. 12/385,794—Mar. 24, 2011 PTO Office Action.
U.S. Appl. No. 12/448,194—Mar. 31, 2011 PTO Office Action.

* cited by examiner

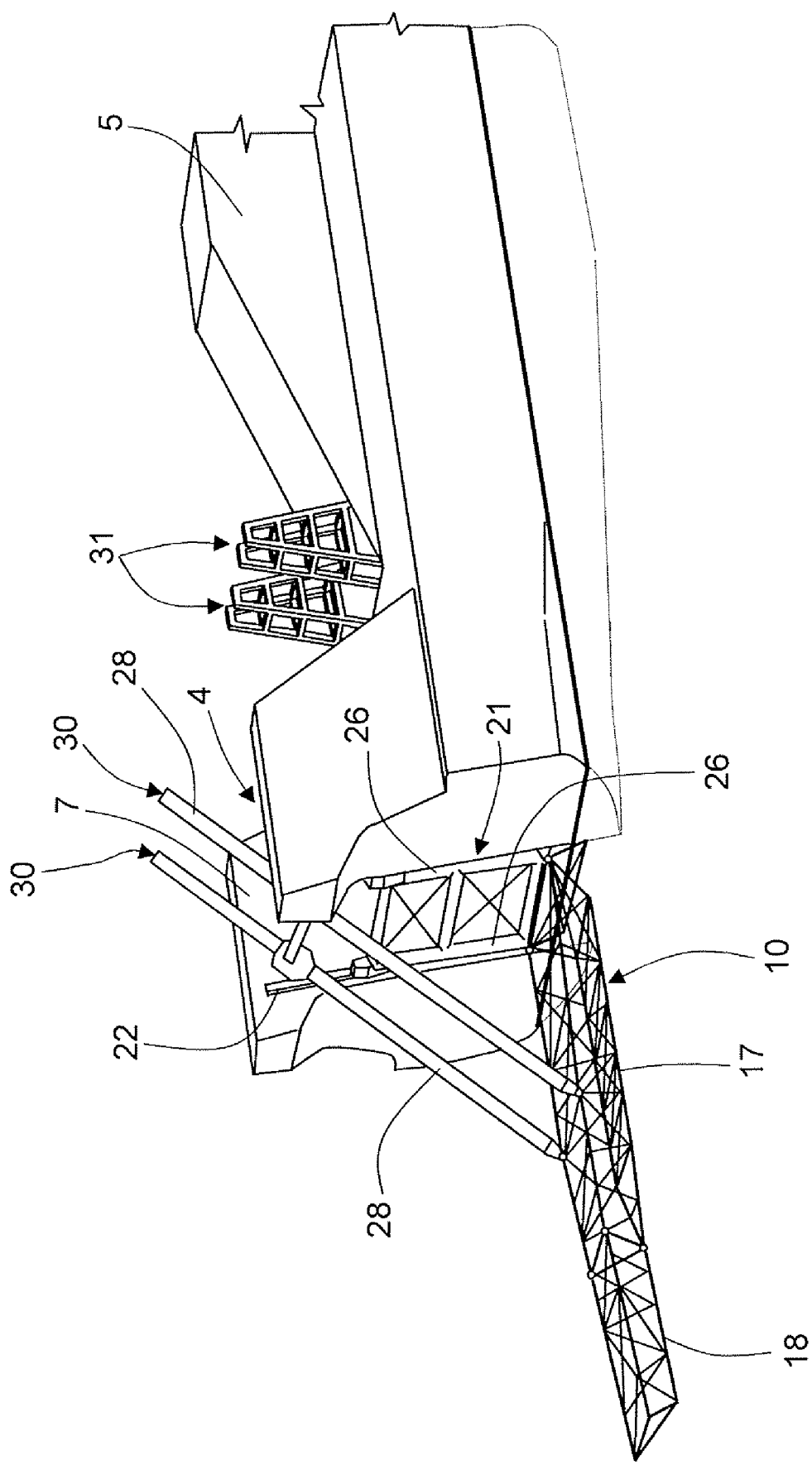

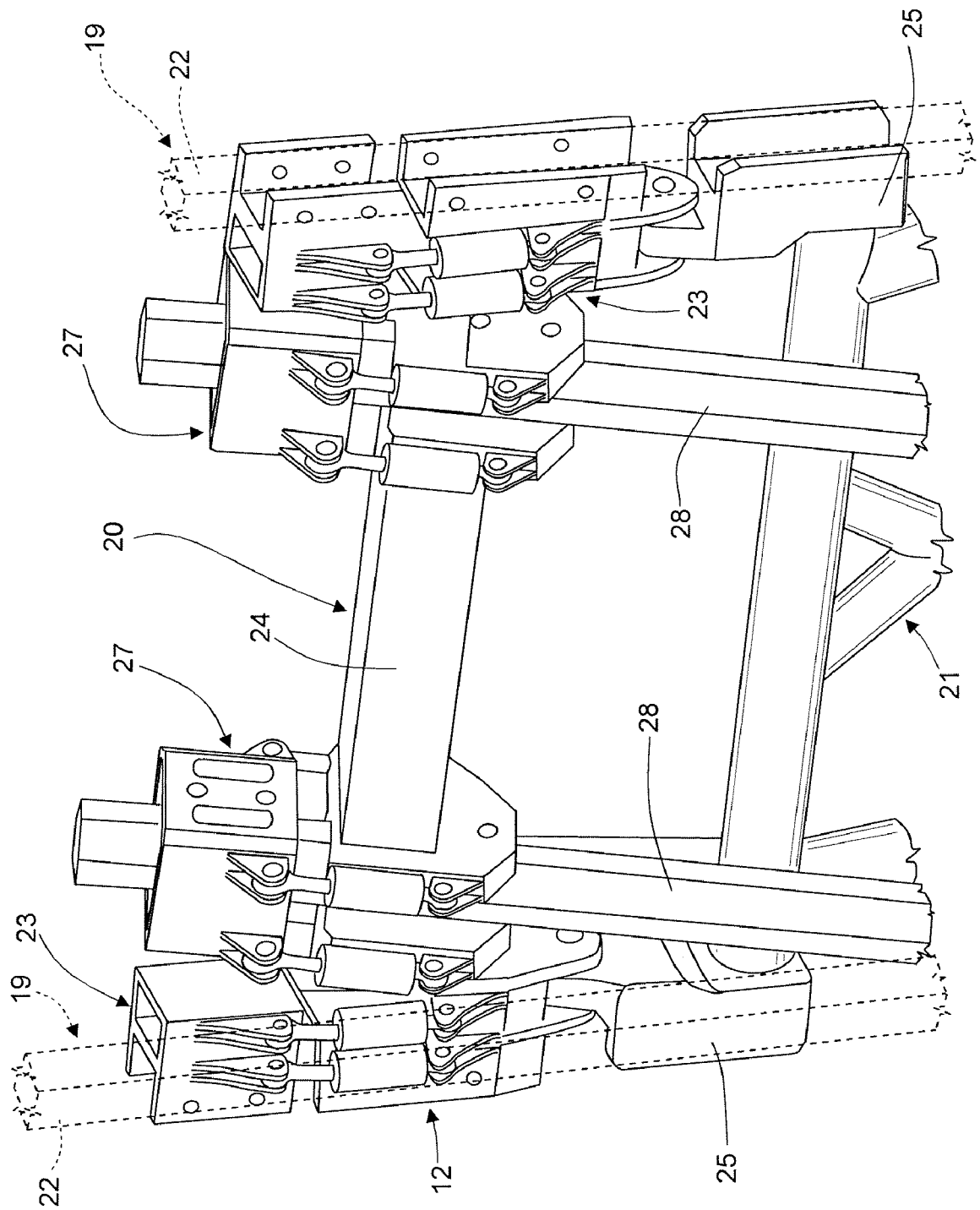

LAY RAMP FOR AN UNDERWATER-PIPELINE LAYING VESSEL, LAY RAMP ACTUATING METHOD, AND LAYING VESSEL COMPRISING SUCH A LAY RAMP

TECHNICAL FIELD

The present invention relates to a lay ramp for an underwater-pipeline laying vessel.

BACKGROUND ART

A laying vessel is a floating unit comprising a production line for producing the underwater pipeline, and equipped at the stern with a lay ramp, which forms an extension of the production line and provides for laying the underwater pipeline on the sea bed. Though the following description refers specifically to laying pipelines in the sea, the present invention also applies to any stretch of water large and deep enough to accommodate a laying vessel.

At present, underwater pipelines are produced and laid using two main methods, depending on the depth of the sea bed.

A first method is to produce the pipeline on a vertical production line, and lay the pipeline vertically, so that the portion of the pipeline extending between the vessel and the sea bed assumes a "J" shape. This method is particularly suitable for laying deep-sea underwater pipelines. A second method is to produce the pipeline on a substantially horizontal production line, and lay the pipeline using a lay ramp, which, in the work configuration, guides and supports the pipeline along an arc-shaped path having a first portion above sea level, and a second portion below sea level. Using this method, the pipeline being laid assumes an "S" shape between the vessel and sea bed, and various types of vessels can be employed, such as pontoons, barges, semisubmersible and single-hull vessels. Pontoons and barges are the underwater-pipeline laying vessels most commonly used in the past; semisubmersible vessels are particularly suitable for laying underwater pipelines in bad weather (rough sea); and single-hull vessels have the advantage of being fast, have ample pipe storage space, and can accommodate relatively long production lines with a high output rate.

Laying underwater pipelines using the second method calls for relatively good weather conditions, so much so that, in rough-sea conditions, laying is suspended: the pipeline being laid is left on the sea bed, possibly attached to a salvage cable; and the lay ramp is set as high as possible above sea level in a so-called "survival configuration".

Moreover, the lay ramp must be movable into various work configurations, depending on the depth of the sea bed and the characteristics of the pipeline, and into an in-transit configuration allowing unobstructed movement of the vessel.

Accordingly, the lay ramp comprises an actuating device for altering its configuration and its position with respect to the vessel.

One particular type of lay ramp, designed to assume various configurations and positions, is described in the Applicant's U.S. Pat. No. 4,257,718, which describes a semisubmersible underwater-pipeline laying vessel equipped with a lay ramp comprising an inside ramp hinged to the vessel; an outside ramp hinged to the inside ramp; and an actuating device comprising a first actuating assembly for rotating the inside ramp with respect to the vessel, and a second actuating assembly for rotating the outside ramp with respect to the inside ramp. The first actuating assembly is connected to the inside ramp, and is movable along a substantially vertical runner fixed to the vessel; and the second actuating assembly is connected to the outside ramp, and is movable along a horizontal runner fixed to the vessel.

In the technical solution described in U.S. Pat. No. 4,257,718, the horizontal runner comprises rails fixed to the ceiling of the deck.

Though highly efficient, this technical solution has the drawback of being specially designed for a semisubmersible vessel, and not easily adaptable to a single-hull vessel, the advantages of which—longer production line, higher output, more pipe storage space, faster travelling speed—make it preferable to a semisubmersible vessel in many applications.

A single-hull vessel, having no stern top deck to which to fix the horizontal rails, cannot be equipped with a lay ramp of the type described in U.S. Pat. No. 4,257,718, but has a well at the stern at least partly housing the lay ramp, so lay ramps comprising an inside ramp and an outside ramp have cable actuating assemblies. Cables, however, are not an ideal solution, by requiring guide pulleys, and by only providing for one-sided restraint. That is, a cable only provides for restraint when pulled, performs no restraining function when compressed or bent, and so fails to provide for stable configurations and positions of the lay ramp.

DISCLOSURE OF INVENTION

It is an object of the present invention to provide a lay ramp of the type described above, that can be installed on any type of laying vessel, eliminates the drawbacks of the known art, and, at the same time, provides for fast configuration and position adjustment.

According to the present invention, there is provided a lay ramp for an underwater-pipeline laying vessel, the lay ramp comprising an inside ramp hinged to the laying vessel; an outside ramp hinged to the inside ramp; and an actuating device comprising a first actuating assembly for rotating the inside ramp with respect to the laying vessel, and a second actuating assembly for rotating the outside ramp with respect to the inside ramp; the lay ramp being characterized in that the second actuating assembly is secured to the outside ramp and to the first actuating assembly.

According to the present invention, the actuating assembly of the outside ramp does not need runners fixed to the laying vessel.

The present invention also relates to a lay ramp actuating method.

According to the present invention, there is provided a method of actuating a lay ramp of an underwater-pipeline laying vessel, the lay ramp comprising an inside ramp hinged to the laying vessel; an outside ramp hinged to the inside ramp; and an actuating device comprising a first and a second actuating assembly; the method comprising rotating the inside ramp with respect to the laying vessel by means of the first actuating assembly, and rotating the outside ramp with respect to the inside ramp by means of the second actuating assembly; the method being characterized by moving the first and second actuating assembly along a common path; and the second actuating assembly being secured to the outside ramp and to the first actuating assembly.

The present invention also relates to a laying vessel.

According to the present invention, there is provided an underwater-pipeline laying vessel equipped with a lay ramp as claimed in any one of claims 1 to 14; the laying vessel being characterized by being a single-hull vessel.

BRIEF DESCRIPTION OF THE DRAWINGS

A non-limiting embodiment of the present invention will be described by way of example with reference to the accompanying drawings, in which:

FIGS. 2a,2b,2c,2d show views in perspective, with parts removed for clarity, of a laying vessel equipped with the FIG. 1 lay ramp in different configurations and positions;

FIG. 3 shows a larger-scale view in perspective, with parts removed for clarity, of a detail of the FIG. 1 lay ramp;

BEST MODE FOR CARRYING OUT THE INVENTION

Figure 1:
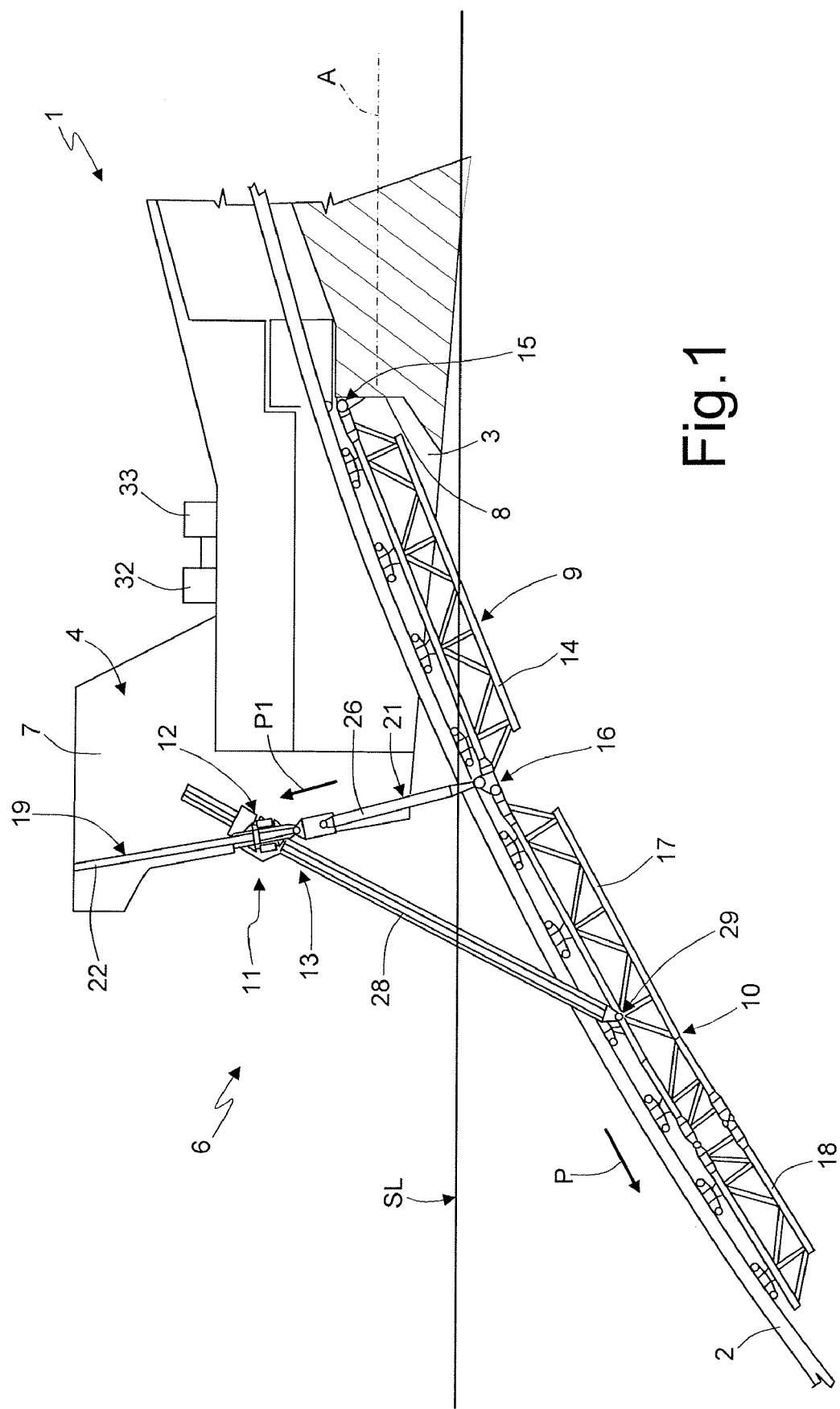
FIG. 1 shows a partly sectioned side view, with parts removed for clarity, of a laying vessel equipped with a lay ramp in accordance with the present invention.

Number 1 in FIG. 1 indicates a laying vessel for laying an underwater pipeline 2 in relatively deep water, the level of which is indicated SL. In the example shown, laying vessel 1 is a single-hull ship extending along a longitudinal axis A and comprising a hull 3; an aftercastle 4; and a production line 5 (FIG. 2a) for producing underwater pipeline 2 by joining pipes not shown in the drawings.

Laying vessel 1 is equipped with a lay ramp 6, which defines an extension of the production line, and, in the FIG. 1 configuration, guides and supports underwater pipeline 2 along an arc-shaped path P having a first portion above sea level SL, and a second portion below sea level SL.

Aftercastle 4 of laying vessel 1 has, in planform, a well symmetrical with respect to axis A and bounded by two opposite parallel walls 7 (only one shown in FIG. 1), and by a wall 8 adjacent to both walls 7 and crosswise to axis A.

Lay ramp 6 is fitted to aftercastle 4, is housed at least partly inside the well between walls 7 and 8, and comprises an inside ramp 9 hinged to laying vessel 1; an outside ramp 10 hinged to inside ramp 9; and an actuating device 11, which provides for supporting and rotating inside ramp 9 with respect to laying vessel 1, supporting and rotating outside ramp 10 with respect to inside ramp 9, and locking inside ramp 9 and outside ramp 10 in a number of configurations and positions. Actuating device 11 comprises an actuating assembly 12 connecting inside ramp 9 to aftercastle 4; and an actuating assembly 13 connecting outside ramp 10 to actuating assembly 12.

More specifically, inside ramp 9 comprises a substantially rigid trestle structure 14, which has a first end hinged to wall 8 by a hinge 15 with an axis perpendicular to longitudinal axis A of laying vessel 1 and substantially horizontal (in calm-sea conditions); and a second end hinged to outside ramp 10 by a hinge 16 with an axis parallel to the axis of hinge 15. Outside ramp 10 comprises a substantially rigid trestle structure 17 similar to trestle structure 14 of inside ramp 9 and hinged to inside ramp 9 by hinge 16; and an optional further trestle structure 18 hinged to trestle structure 17, and which is used to lay underwater pipelines in relatively deep water, to prevent excessive curving (so-called "overbending") of the pipeline. In the FIG. 1 work configuration, trestle structures 17 and 18 are fixed to each other so that outside ramp 10 acts as a rigid member.

With reference to FIG. 3, actuating assembly 12 comprises two runners 19 fixed to walls 7 of aftercastle 4; a carriage 20 movable selectively along runners 19; and a rigid member 21 connecting carriage 20 to inside ramp 9.

In the example shown, the two runners 19 are defined by respective parallel, facing rails 22 fixed to respective walls 7 of aftercastle 4 (FIG. 1). With reference to FIG. 1, rails 22 define a path P1, crosswise to axis A, of carriage 20.

Figure 4:
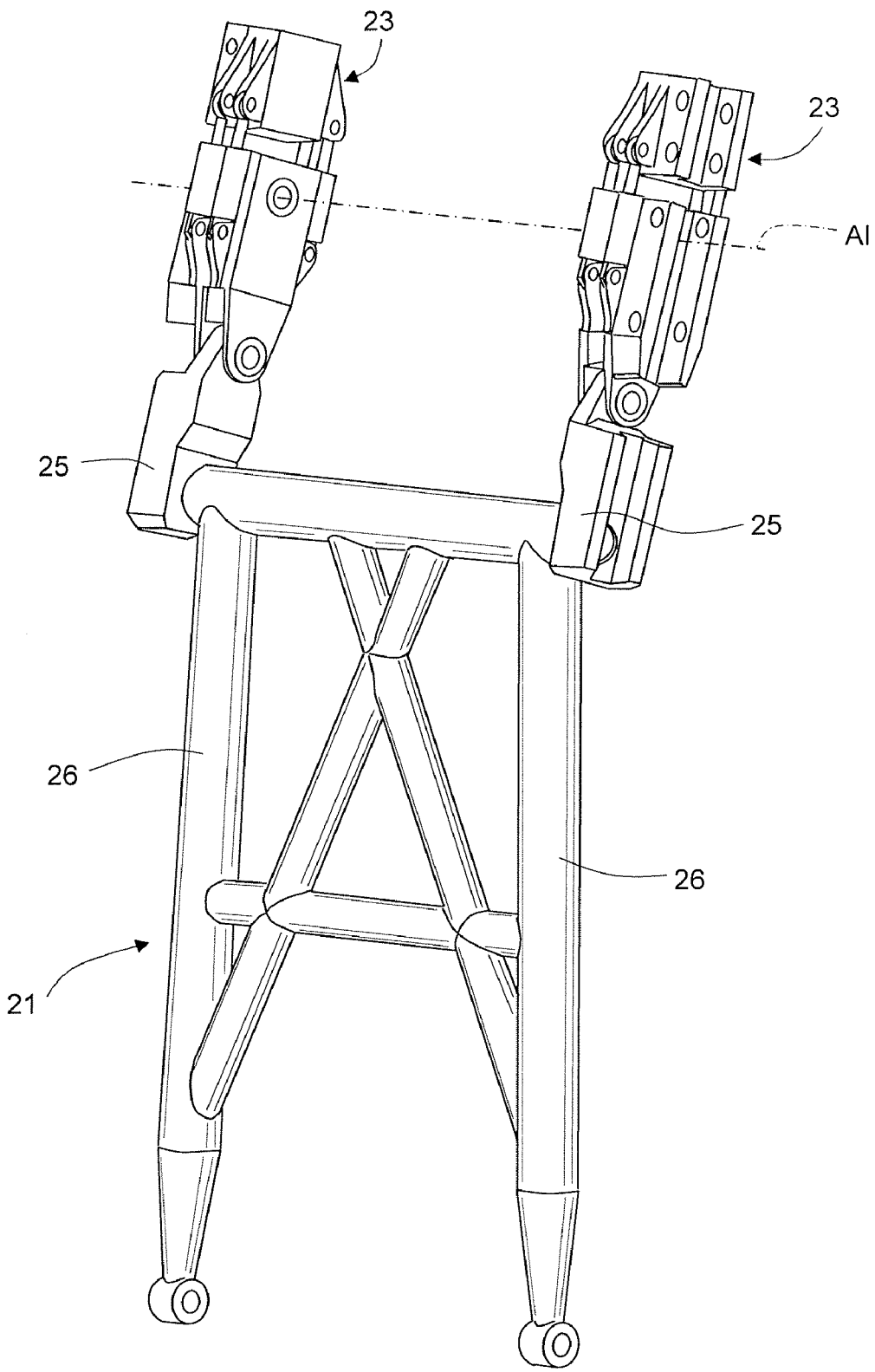
FIG. 4 shows a view in perspective, with parts removed for clarity, of a detail of the FIG. 1 lay ramp.

With reference to FIG. 3, carriage 20 engages, and is powered to run along, rails 22, and comprises two actuators 23—in the example shown, hydraulic jacks. Each actuator 23 has a seat housing a respective rail 22, and is moved in steps with respect to rail 22 by a take-up mechanism (jack-rail mechanism or so-called jacking system). Carriage 20 comprises a beam 24 connecting the two actuators 23; and two skids 25, each hinged to a respective actuator 23. Beam 24 is secured to the two actuators 23 to rotate about an axis A1 (FIG. 4) parallel to the axis of hinge 15; and each skid 25 has a seat engaged by a respective rail 22 and is hinged to rigid member 21. Rigid member 21 is a portal comprising two opposite bars 26, each of which is hinged at the ends to carriage 20—more specifically, to a respective skid 25—and to inside ramp 9—more specifically, to hinge 16, to avoid providing an additional hinge point along inside ramp 9. Bars 26 are located on opposite sides, to ensure balanced support, of inside ramp 9.

The two actuators 23 are synchronized, and provide for supporting inside ramp 9, and therefore outside ramp 10, on both sides.

Actuating assembly 13 is secured to outside ramp 10 (FIG. 2) and to carriage 20, and comprises two actuators 27—in the example shown, hydraulic take-up jacks-fitted to carriage 20—more specifically, to beam 24; and two rigid elongated members 28, each connected to a mid-point of outside ramp 10 and to a respective actuator 27. Each elongated member 28 has one end 29 hinged to outside ramp 10 (FIG. 1), and prismatically engages a seat on actuator 27 (FIG. 3), which, in the same way (jacking system) as for the actuator 23 and rail 22 connection, provides for moving, pushing, pulling, and locking elongated member 28 with respect to carriage 20, and for adjusting the distance between actuator 27 and hinged end 29 (FIG. 1). The distance, measured along elongated member 28, between hinged end 29 and respective actuator 27 is referred to herein as the "useful length" of elongated member 28.

Figure 2A:
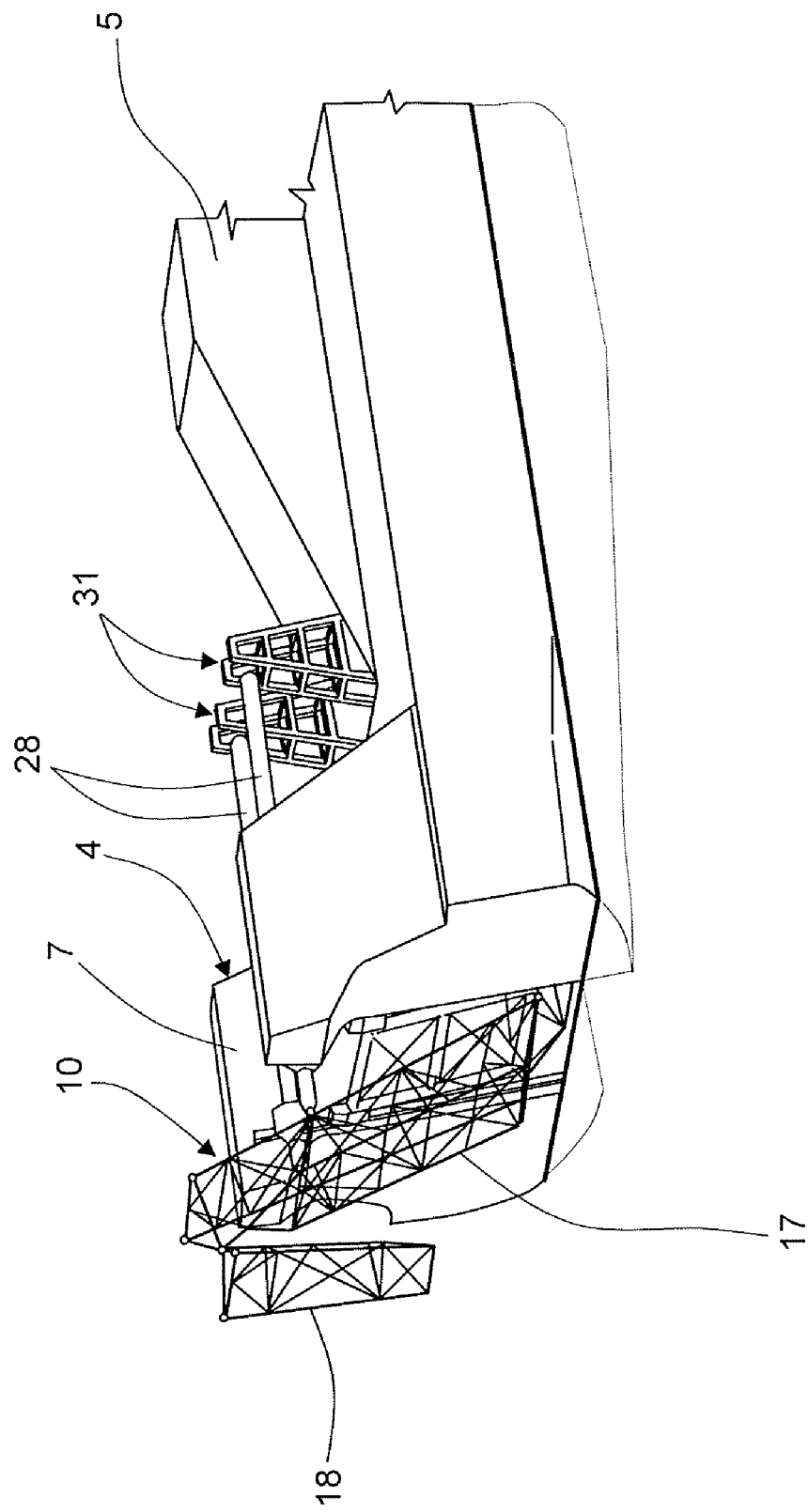
Figure 2C:
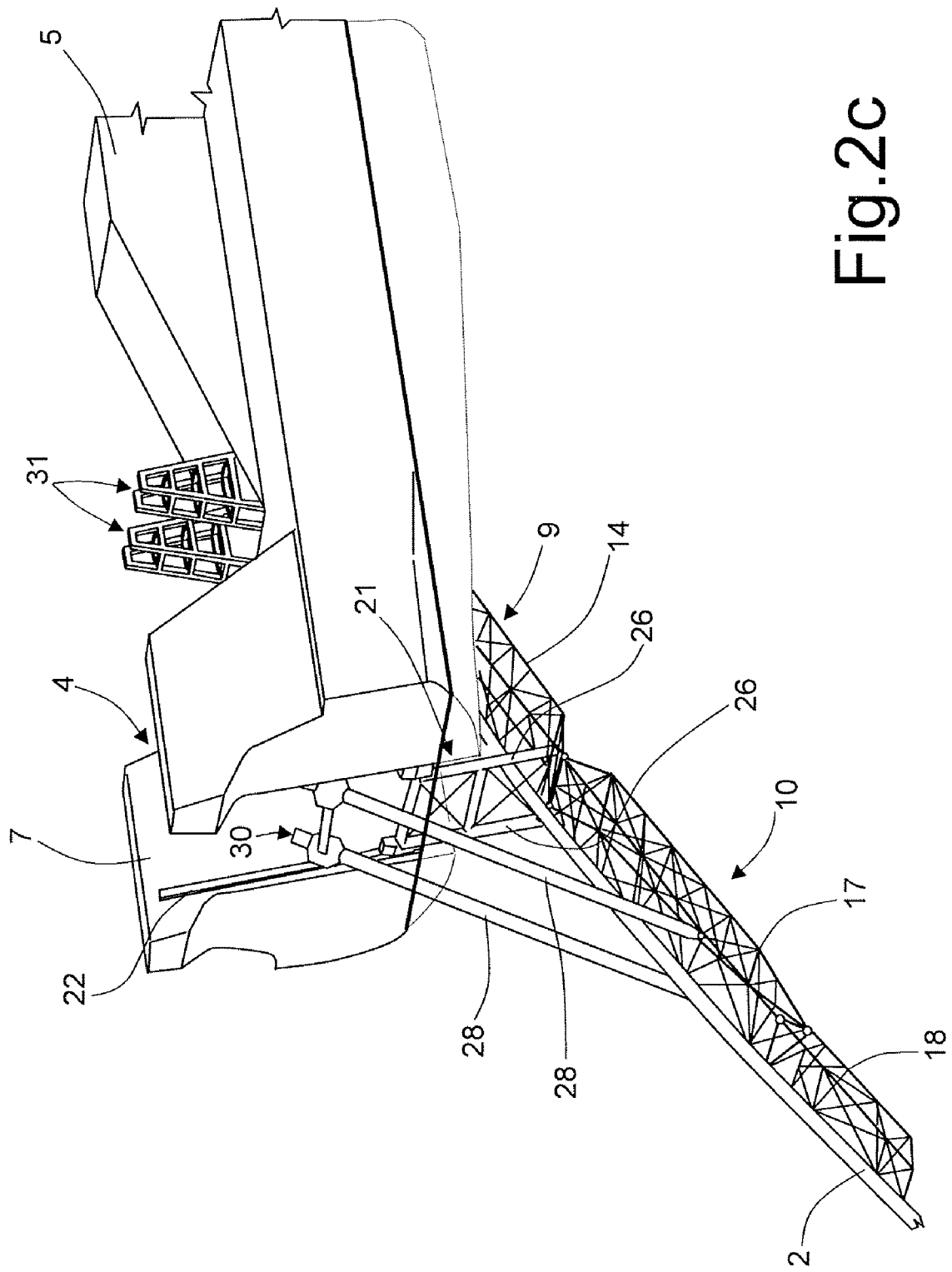
Figure 2D:
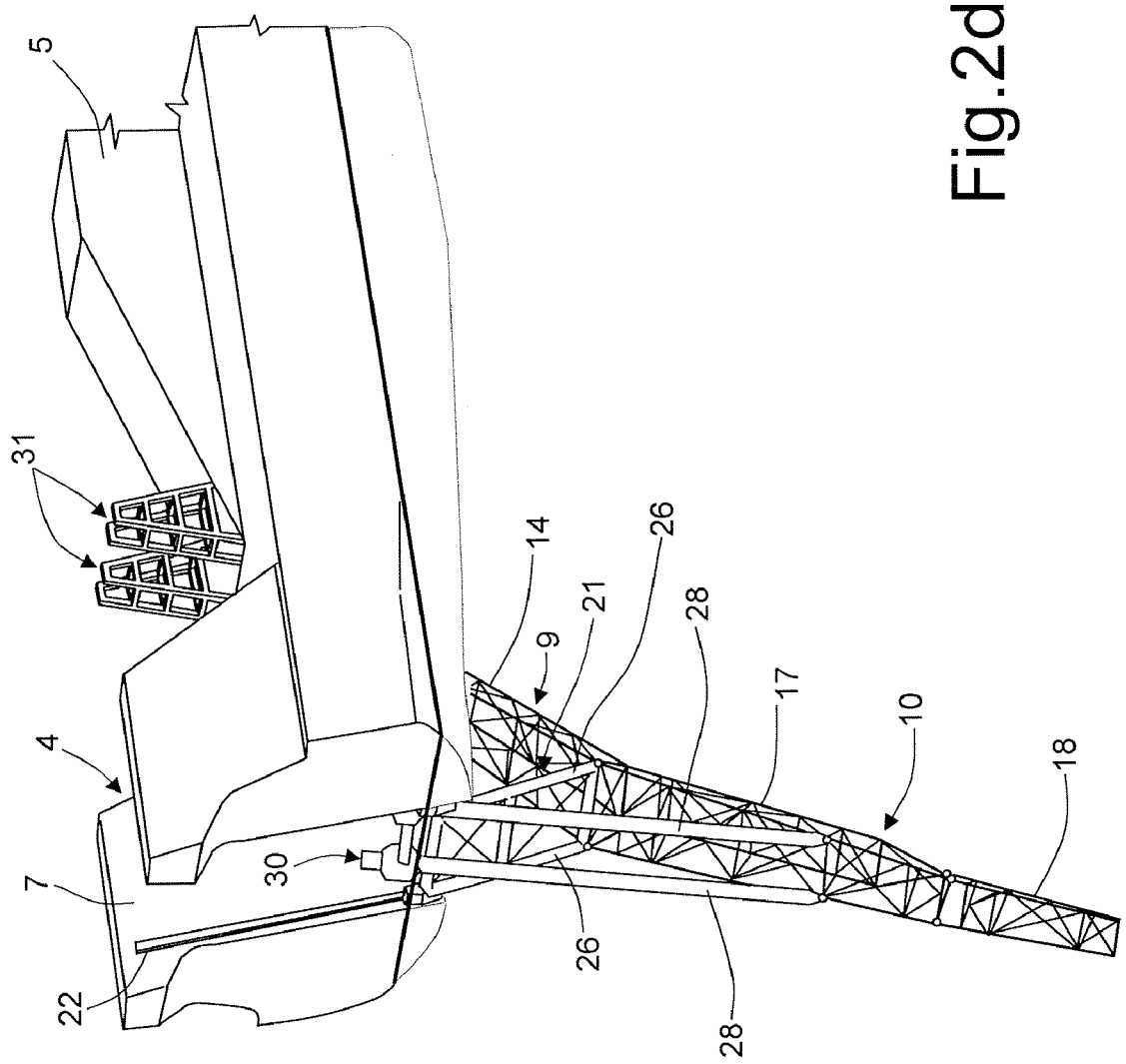

With reference to FIG. 2b, elongated member 28, in the example shown, is a tube, but may be defined by a bar or other rigid elongated members, i.e. capable of withstanding not only compressive but also tensile and bending stress, and comprises a supporting end 30 opposite hinged end 29, and which rests on a supporting structure 31, fixed to laying vessel 1, when lay ramp 6 is set to a survival configuration indicated by the dash line and the Roman numeral I in FIG. 2a.

With reference to FIG. 1, actuating device 11 comprises a hydraulic system 32; and a control unit 33 for controlling hydraulic system 32 and, hence, actuators 23 and 27. The hoses connecting hydraulic system 32 to actuators 23 and 27 are not shown in the drawings, for the sake of simplicity.

Operation of lay ramp 6 will be clear from the foregoing description and FIGS. 2a-2d. More specifically, actuators 23 are operated synchronously to move carriage 20 along path P1 and rotate inside ramp 9 with respect to laying vessel 1. And, similarly, actuators 27 are operated synchronously to rotate outside ramp 10 with respect to inside ramp 9.

Actuating assemblies 12 and 13 may be operated independently or simultaneously to move the inside ramp and outside ramp quickly into the desired configurations and positions. FIGS. 2a, 2b, 2c, 2d show four different configurations of lay ramp 6 the survival configuration I; the in-transit configuration II; a first work configuration III; and a second work configuration IV for laying underwater pipelines in relatively deep water.

In an alternative embodiment not shown, rails 22 and elongated members 28 are racks, and actuators 23 and 27 comprise gears meshing with the racks.

Though the above description refers specifically to a single-hull vessel 1, lay ramp 6 according to the present invention may also be installed on other types of laying vessels, including semisubmersible vessels.

The invention claimed is:

1. A lay ramp for an underwater-pipeline laying vessel, the lay ramp comprising an inside ramp hinged to the laying vessel; an outside ramp hinged to the inside ramp; and an actuating device comprising a first actuating assembly for rotating the inside ramp with respect to the laying vessel, and a second actuating assembly for rotating the outside ramp with respect to the inside ramp; the second actuating assembly being secured directly to the outside ramp and to the first actuating assembly; wherein the first actuating assembly comprises two runners each being fixed to the laying vessel; a carriage that is movable along each of the two runners and powered by two first actuators; and a rigid member connecting the carriage to the inside ramp, the carriage portion includes a beam assembly interconnecting the two first actuators, the beam assembly being perpendicular to the runners and rotatable about an axis (A1).

2. The lay ramp as in claim 1, wherein the two first actuators rotate the inside ramp with respect to the laying vessel; and the second actuating assembly comprises at least one second actuator to rotate the outside ramp with respect to the inside ramp, and a rigid elongated member connected to the outside ramp and engaging the at least one second actuator, which provides for pulling, pushing, and locking the elongated member with respect to the at least one second actuator.

3. The lay ramp as in claim 1, wherein the rigid member is hinged to the inside ramp and to the carriage.

4. The lay ramp as in claim 1, wherein the two runners are defined respectively by two rails, each engaging a respective first actuator.

5. The lay ramp as in claim 1, wherein the two first actuators are hydraulic take-up jacks.

6. The lay ramp as claimed in claim 1, wherein the second actuating assembly comprises two second actuators fixed to the beam assembly; and two rigid elongated members; each elongated member being hinged to the outside ramp, and prismatically engaging a respective second actuator, which pulls, pushes, and locks the respective elongated member with respect to the respective second actuator.

7. The lay ramp as in claim 6, wherein the second actuators are hydraulic take-up jacks.

8. A method of actuating a lay ramp of an underwater-pipeline laying vessel, the lay ramp comprising an inside ramp hinged to the laying vessel; an outside ramp hinged to the inside ramp; and an actuating device comprising a first and a second actuating assembly; the method comprising the steps of:
rotating the inside ramp with respect to the laying vessel by means of the first actuating assembly, and;
rotating the outside ramp with respect to the inside ramp by;
means of the second actuating assembly; moving the first and second actuating assembly along a common path (P1); and;
securing the second actuating assembly directly to the outside ramp and to the first actuating assembly; wherein the first actuating assembly comprises two runners each being fixed to the laying vessel; a carriage movable along each of the two runners and is powered by two first actuators; and a rigid member connecting the carriage to the inside ramp, wherein the carriage comprises a beam connecting the two first actuators, the beam being perpendicular to the runners, and wherein the beam rotates about an axis (A1).

9. The method as in claim 8, wherein the first actuating assembly comprises two first actuators; and the second actuating assembly comprises at least one second actuator, and at least one rigid elongated member connected to the outside ramp and engaging the at least one second actuator; the method comprising the additional step of adjusting a distance, measured along said at least one rigid elongated member, between the outside ramp and the at least one second actuator.

10. The method as in claim 9, including the additional step of selectively pulling, pushing, and locking the at least one rigid elongated member with respect to the at least one second actuator.

11. An underwater-pipeline laying vessel equipped with a lay ramp comprising an inside ramp hinged to the laying vessel; an outside ramp hinged to the inside ramp; and an actuating device comprising a first actuating assembly for rotating the inside ramp with respect to the laying vessel, and a second actuating assembly for rotating the outside ramp with respect to the inside ramp; the lay ramp being characterized in that the second actuating assembly is secured directly to the outside ramp and to the first actuating assembly; wherein the laying vessel is comprised of a single-hull vessel having a longitudinal axis (A), and an aftercastle having two opposing, spaced apart walls that are parallel to each other and parallel to the longitudinal axis (A); said first actuating assembly being defined respectively by two rails that are fixed to said opposing walls, wherein the aftercastle has a further wall positioned crosswise to the longitudinal axis (A), and the inside ramp being hinged to the further wall of the aftercastle.

12. The laying vessel as in claim 11, further comprising a well in the aftercastle with the lay ramp being housed at least partly in said well.

13. A lay ramp for an underwater-pipeline laying vessel, the lay ramp comprising:
an inside ramp hinged to the laying vessel;
an outside ramp hinged to the inside ramp; and
an actuating device comprising:
a first actuating assembly configured to rotate the inside ramp with respect to the laying vessel, and being secured to the inside ramp and to the laying vessel, and including a carriage portion that is operatively mounted to move generally vertically relative to the laying vessel and thereby move the inside ramp through an arc of travel, and
a second actuating assembly configured to rotate the outside ramp with respect to the inside ramp, and secured directly to the outside ramp and the carriage portion of the first actuating assembly.

* * * * *